US010004182B1

(12) United States Patent
Pannell (10) Patent No.: US 10,004,182 B1
(45) Date of Patent: Jun. 26, 2018

(54) COMPOST LEVELING APPARATUS (71) Applicant: Pannell Manufacturing Corp., Avondale, PA (US)

(72) Inventor: Robert T. Pannell, Kennett Square, PA (US)

(73) Assignee: Pannell Manufacturing Corporation, Avondale, PA (US)

( * ) Notice: Subject to any disclaimer, the term of this patent is extended or adjusted under 35 U.S.C. 154(b) by 0 days. days.

(21) Appl. No.: 15/431,871

(22) Filed: Feb. 14, 2017

Related U.S. Application Data (60) Provisional application No. 62/295,796, filed on Feb. 16, 2016.

(51) Int. Cl.
  *A01G 18/60* (2018.01)
  *A01G 18/20* (2018.01)
  *A01G 1/04* (2006.01)
(52) U.S. Cl.
  CPC ............. *A01G 18/20* (2018.02); *A01G 1/042* (2013.01); *A01G 1/044* (2013.01); *A01G 18/60* (2018.02)
(58) Field of Classification Search
  CPC ................................ A01G 1/044; A01F 12/46
  See application file for complete search history.

(56) References Cited

U.S. PATENT DOCUMENTS

| 3,292,305 A | 12/1966 | Stengel |
| 3,856,276 A | 12/1974 | Pannell |
| 3,881,707 A | 5/1975 | Toto |
| 3,936,975 A | 2/1976 | de Winter |
| 3,990,496 A | 11/1976 | Middlebrook et al. |
| 4,170,432 A | 10/1979 | Pia |
| 4,267,664 A | 5/1981 | Henke |
| 4,273,495 A | 6/1981 | Pannell |
| 4,280,800 A | 7/1981 | Bunn |
| 4,371,305 A | 2/1983 | Pannell |
| 4,422,375 A | 12/1983 | Morganti |
| 4,479,428 A * | 10/1984 | Krueger ................. B27N 3/143 100/210 |
| 4,717,307 A | 1/1988 | Ciuffetelli |
| 4,776,872 A | 10/1988 | Mulleavy et al. |

(Continued)

FOREIGN PATENT DOCUMENTS

GB 704403 * 2/1954

*Primary Examiner* — Jessica B Wong
(74) *Attorney, Agent, or Firm* — Rogowski Law LLC (57) ABSTRACT

A mushroom compost leveling apparatus includes a panel with a bottom edge where the panel is vertically suspended in a mushroom compost receptacle leaving a gap between the bottom edge and the floor of the receptacle. The panel reciprocates from side to side as mushroom compost is conveyed under the panel. Optionally, the panel includes vanes extending outwardly from a first face surface, and a rake outwardly and downwardly extending from the panel at or near the bottom edge. Optionally, a pair of wheels are mounted for rotation either to the first face of the panel or to a rail of a frame to be isolated from the panel, and the wheels each include paddles that push compost toward the side edges of the mushroom compost receptacle as the wheels are rotated. Optionally, the leveling apparatus is removably attached to sleeves depending over sidewalls of the compost receptacle, and a roller assembly is removably attached to such sleeves downstream of the leveling apparatus.

15 Claims, 8 Drawing Sheets

(56) References Cited

U.S. PATENT DOCUMENTS

| | | |
|---|---|---|
| 5,463,858 A | 11/1995 | Ciuffetelli |
| 5,511,497 A | 4/1996 | Toto |
| 6,186,083 B1 | 2/2001 | Toto |
| 6,817,286 B2 | 11/2004 | Toto |
| 7,044,233 B2 | 5/2006 | Toto |
| 8,069,608 B1 | 12/2011 | Pannell |
| 8,205,379 B2 | 6/2012 | Pannell |
| 8,561,344 B2 | 10/2013 | Pannell |
| 2004/0065215 A1 | 4/2004 | Toto |

* cited by examiner

COMPOST LEVELING APPARATUS

CROSS-REFERENCE TO RELATED APPLICATION

This application is a regular utility application claiming priority under 35 USC § 119(e) to U.S. Provisional Patent Application Ser. No. 62/295,796, filed Feb. 16, 2016, the contents of which are incorporated by reference herein.

BACKGROUND

Mushroom farming comprises generally six steps: (1) Phase I composting; (2) Phase II composting; (3) spawning; or (2a/3a) Phase III composting; (4) casing; (5) pinning; and (6) cropping. The most used and least expensive mushroom compost is straw-bedded horse manure to which nitrogen supplements and a conditioning agent, such as gypsum, are added. After the compost ingredients have been mixed, watered and aerated in Phase I for a requisite number of days, the compost is pasteurized in Phase II. Pasteurization kills insects, unwanted fungi or other pests that may be present in the compost.

Preparing Phase II mushroom compost can be difficult. One reason for the apparent difficulty with this phase is that pasteurization can last up to two weeks, depending upon the production system used. The time required, as well as other difficulties in maintaining temperature control and eliminating pests during this phase have led many mushroom farmers to purchase pre-pasteurized compost. In many cases, the Phase II compost is pre-mixed with mushroom spawn. Alternatively, Phase III compost is pasteurized, pre-mixed with mushroom spawn and spawn run.

When commercial mushroom farmers purchase pre-pasteurized Phase II or Phase III composts, proper compaction of mushroom beds is still necessary to spawn and grow mushrooms. Moreover, regardless the type of receptacle in which the compost is stored during processing, uniform compaction and density of the compost is beneficial for mushroom cultivation. For maximum yield, mushroom beds should have Phase II and Phase III compost density and compaction that fosters gas exchange, keeps compost temperatures sufficiently low, and prevents spawn kill in the next phase of processing.

Some commercial mushroom farmers who purchase pre-pasteurized compost introduce the Phase II or Phase III compost into beds by conveyor and attempt to use spawning machines to compact the compost. These machines, however, are not designed to compact to the degree desired for mushroom cultivation. Furthermore, these machines are less than desirable for commercial mushroom farmers because during operation they also chop up the spawn incorporated into the compost, potentially interfering with the next step in mushroom farming.

Other known compacting systems and methods are impractical for commercial use. One such system shown in U.S. Pat. No. 4,422,375 uses an assembly with rollers and smoothing plates. In this system, mushroom compost is partially compacted after placement into the mushroom bed. The assembly is then horizontally positioned over the bed and manually guided by two operators located on each side of the bed. This system tends to compact only a surface layer portion of the bed. Compaction to some degree has also been performed by hand after placement of compost in the bed. These time-consuming manual systems and methods make clear the need for improved mushroom compaction systems.

One significant improvement to mushroom compost compacting systems and methods is disclosed in U.S. Pat. Nos. 8,561,344; 8,205,379 and 8,069,608. In such system, a roller assembly mounted to the mushroom compost receptacle works in combination with a compost conveyor. Mushroom compost is conveyed to the nip between the roller assembly and the floor portion of the mushroom compost receptacle. The improved mushroom compacting system effectively compacts a major portion of the mushroom compost held in the compost receptacle.

Before introducing mushroom compost to the nip between the compost compacting roller and the floor of the mushroom compost receptacle, preferably the mushroom compost is raked across the front end of the mushroom compost receptacle to level the height that is introduced to the nip. Generally, significant quantities of mushroom compost are poured or dumped onto the conveyor at the front end while workers rake by hand to attempt to level the height as the compost is conveyed toward the compost compacting roller. Raking by hand is difficult and frequently does not achieve a consistent height of mushroom compost introduced to the nip. This can lead regions having different degrees of compaction in the compost receptacle after compaction by the roller. Solutions to this problem continue to be sought.

While certain aspects of prior art mushroom compacting systems have been discussed, aspects of these systems are in no way disclaimed and it is contemplated that the claimed invention may encompass one or more aspects of the prior art devices discussed herein.

SUMMARY OF THE INVENTION

In a first aspect, a mushroom compost leveling apparatus has a panel adapted for positioning vertically in a mushroom compost receptacle leaving a gap between the bottom edge of the panel and a floor of the mushroom compost receptacle. A crank has its first end joined directly or indirectly to the panel and its second end joined directly or indirectly to a rotating output shaft of a motor. Motor shaft rotation is converted to reciprocal motion to reciprocate the panel to cause side to side movement of the panel within the mushroom compost receptacle. A plurality of vertically directed vanes extend from a face surface of the panel. The vertically directed vanes may be disposed at an angle from about 20 degrees to about 90 degrees from the face surface of the panel. A rake is joined directly or indirectly to the panel, and defines a plurality of fingers that extend away from a surface of the panel at an angle thereto and downwardly from the bottom edge of the panel.

Optionally, a row of teeth projects outwardly from the outer edge of each vane extending from the face surface of the panel. In one embodiment, the teeth extend outwardly in line or in parallel with the face surface of each vane. In another embodiment, the teeth extend outwardly, but are disposed at an angle to the face surface of the respective vane, such as an angle of 5 degrees to 40 degrees offset from the face surface of the vane.

In one embodiment, a pair of wheels are mounted to a face surface of the panel. The first wheel is rotatable in a clockwise direction and the second wheel is rotatable in a counter-clockwise direction, with the first wheel and the second wheel disposed in a common plane or a substantially common plane. Optionally, paddles or blades extend from a surface of the first wheel, and paddles or blades extend from a surface of the second wheel. The paddles or blades are adapted to push compost toward side edges of the compost receptacle as the wheels rotate.

In one preferred embodiment, a series of teeth project from the outer edges of the paddles or blades. The teeth may be disposed in line or parallel with the paddle or blade faces, or may be disposed at an angle in the range of about 5 to about 40 degrees offset from the paddle or blade faces.

In another preferred embodiment, the panel with vertically directed vanes is mounted for reciprocal movement to a rail of a support frame, and the pair of wheels is mounted to the rail of the support frame, with each wheel at a different location on such rail. Such rail and frame isolate the rotational movement of the pair of wheels from the reciprocal movement of the panel.

The mushroom compost leveling apparatus is installed into a mushroom compost receptacle so as to establish a gap between a floor of the mushroom compost receptacle and the bottom edge of the mushroom compost leveling apparatus. A conveyor is moved along the floor of the mushroom compost receptacle and through the gap. Mushroom compost is introduced onto the conveyor to be conveyed through the gap. The panel of the mushroom compost leveling apparatus is reciprocated as the mushroom compost is conveyed through the gap to level the height of the mushroom compost in the compost receptacle.

Optionally, a portion of the mushroom compost is pushed with vanes vertically disposed on the panel. Optionally, a portion of the mushroom compost is raked after passing under the panel with fingers of a rake joined directly or indirectly to the panel. Optionally, a portion of the mushroom compost is pushed toward side edges of the mushroom compost receptacle with a plurality of paddles or blades extending outwardly from a pair of rotating wheels mounted to the panel (or to a rail or frame that supports the panel and the wheels). The wheels are spaced apart from one another and rotate in opposite directions.

Preferably, the mushroom compost is compacted with a roller after it has been conveyed by the conveyor through the gap between the mushroom compost leveling apparatus and the floor of the mushroom compost receptacle. The roller assembly may be such as disclosed in U.S. Pat. Nos. 8,561,344; 8,205,379 and 8,069,608, or may be a roller assembly that includes an attached post and linkage by which the roller assembly may be lifted by a hoist.

DESCRIPTION OF THE DRAWINGS

The foregoing summary, as well as the following detailed description of the invention, will be better understood when read in conjunction with the appended drawings. For the purpose of illustrating the invention, the drawings show presently preferred embodiments. However, the invention is not limited to the precise arrangements and instrumentalities shown.

DETAILED DESCRIPTION OF EMBODIMENTS

Certain terminology is used in the following description for convenience only and is not limiting. The words "lower," "bottom," "upper," "top," "right" and "left" designate directions in the drawings to which reference is made. The words "inwardly," "outwardly," "upwardly" and "downwardly" refer to directions toward and away from, respectively, the geometric center of the headrest, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

It also should be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Figure 1:
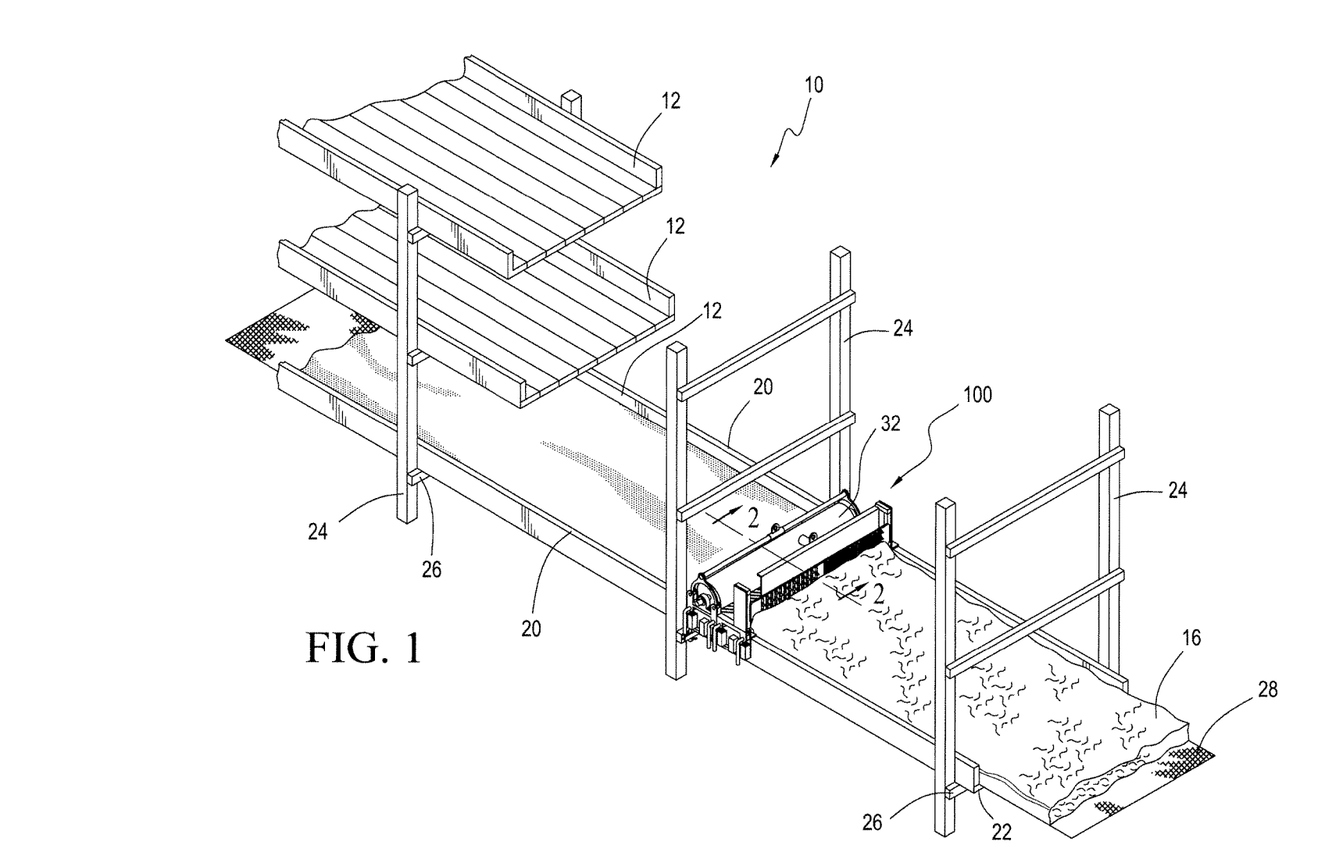
FIG. 1 is a top left front perspective view of a mushroom compost bed with a mushroom compost compacting system and a first embodiment of a mushroom compost leveling apparatus according to the invention.

Turning in detail to the drawings, FIG. 1. illustrates a mushroom compost bed 10 that includes a series of trays or shelves, herein compost receptacles 12, into each of which mushroom compost 16 is deposited or laid. The mushroom compost 16 may be Phase I, Phase II or Phase III compost. Phase II compost may be pre-spawned, and Phase III compost may be spawn run. The compost receptacle 12 may be any geometric configuration suitable to house mushroom compost 16. In one configuration as shown in FIG. 1, the compost receptacle 12 is an elongated bin, tray, or shelf that has two endwalls (not shown), two sidewalls 20, and a bottom 22. The bottom 22 may be a series of slats or decking running generally lengthwise. Each compost receptacle 12 is supported by vertical posts or members 24 positioned at each corner of the compost receptacle 12 and optionally at intervals along the length of the compost receptacle 12. The vertical posts or members 24 may act as supporting legs for one or more compost receptacles 12. As shown in FIG. 1, the vertical posts or members 24 extend vertically to support other compost receptacles (three tiers shown in FIG. 1). These types of multi-tiered compost receptacles are typical in commercial mushroom farming. For additional support, some compost receptacles also have horizontal members or joists 26 that may be mounted to or connected to the vertical members 24 and extend under the floor portion of the compost receptacle 12. Typically, the compost receptacles 12 are wooden, although any suitable material may be used, including, but not limited to plastic, metal, and composite materials.

The mushroom compost 16 is initially placed into the compost receptacle 12 from any suitable source. Preferably, the mushroom compost 16 is distributed inside the compost receptacle 12 along the length of the compost receptacle using a conveyor system (not shown) that acts on the web or conveyor or liner 28 that is placed over the bottom 22 of the compost receptacle 12. In one type of conveyor system, compost is placed on top of the flexible web or conveyor or liner 28 in the bottom 22 of the compost receptacle 12 at a forward end of the compost receptacle 12. The liner 28 is then pulled from the opposite distal or rearward end of the compost receptacle 12, such that the compost 16 is distributed or spread along the length of the compost receptacle 12. Examples of suitable materials for the liner 28 include woven fabrics with a plastic or Teflon coating, or may be polyester.

As shown in detail in U.S. Pat. Nos. 8,609,608; 8,205,379 and 8,561,344, mushroom compost may be compacted using a roller assembly. A compost leveling apparatus 100 of the current invention may be used in conjunction with a roller assembly such as shown in the patents, or a roller assembly 14 as is shown in FIGS. 1-8. Referring to FIGS. 1-5, the roller assembly 14 is removably affixed to the compost receptacle 12. Each roller assembly 14 comprises a roller 32, a shaft 34, two pillow block bearings 50 and two sleeves 44 for joining the roller to the sidewalls 20 of the compost receptacle 12. The shaft 34 and roller 32 extend laterally over the tray portion of the compost receptacle 12. The roller 32 may be made from a lightweight material such as plastic or aluminum, or may be made of another metal lined on its outer surface with a nylon or Teflon or other sheeting. The roller surface is smooth such that the mushroom compost to be compacted by the roller may move easily under the roller 32. In one embodiment, the diameter of roller 32 is from about 8 to 20 inches. The shaft 34 may be formed of steel; however, any material suitable to support the weight of the roller 32 may be used.

Figure 2:
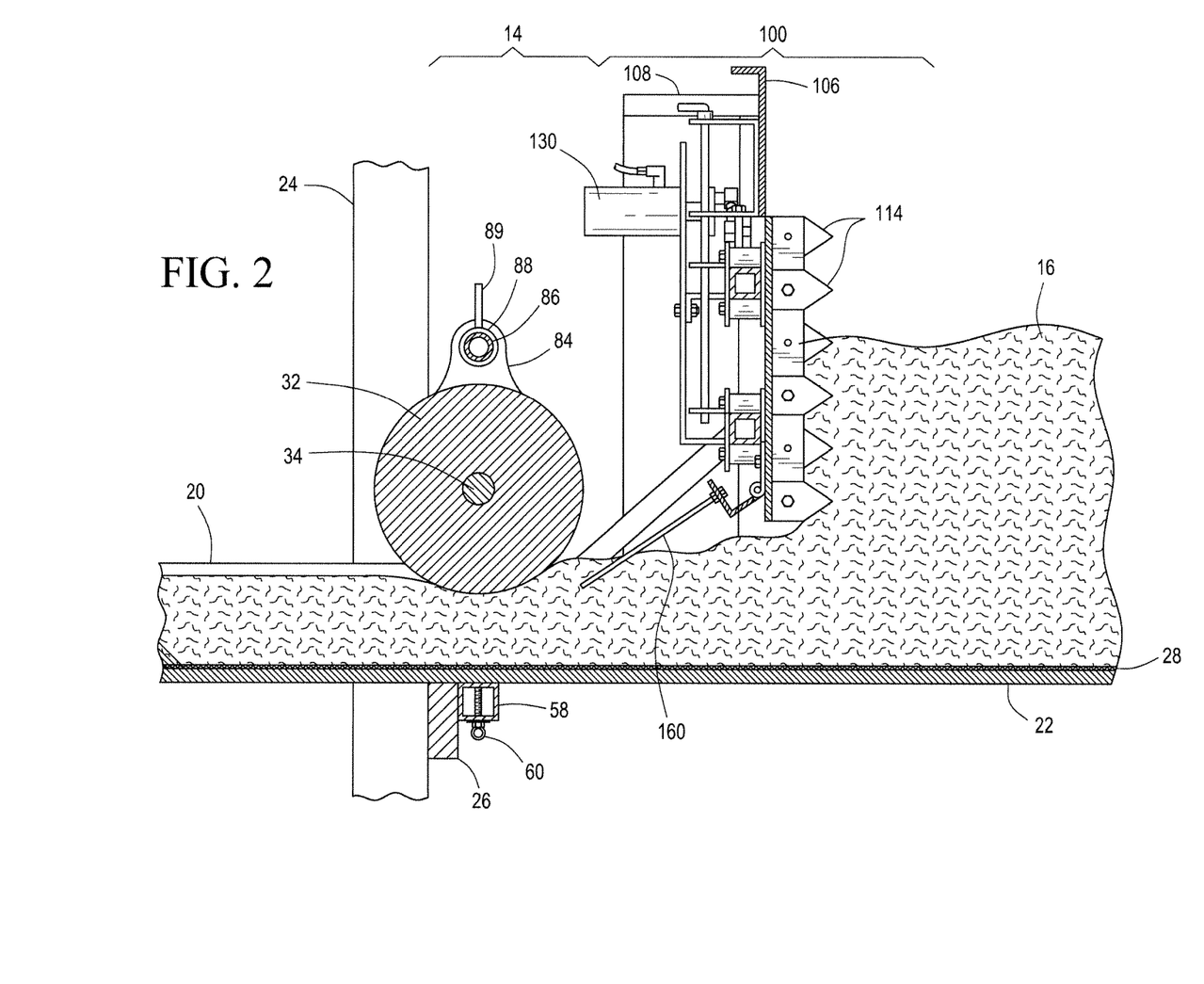
FIG. 2 is a partial cross-sectional view taken along line 2-2 of FIG. 1.
Figure 3:
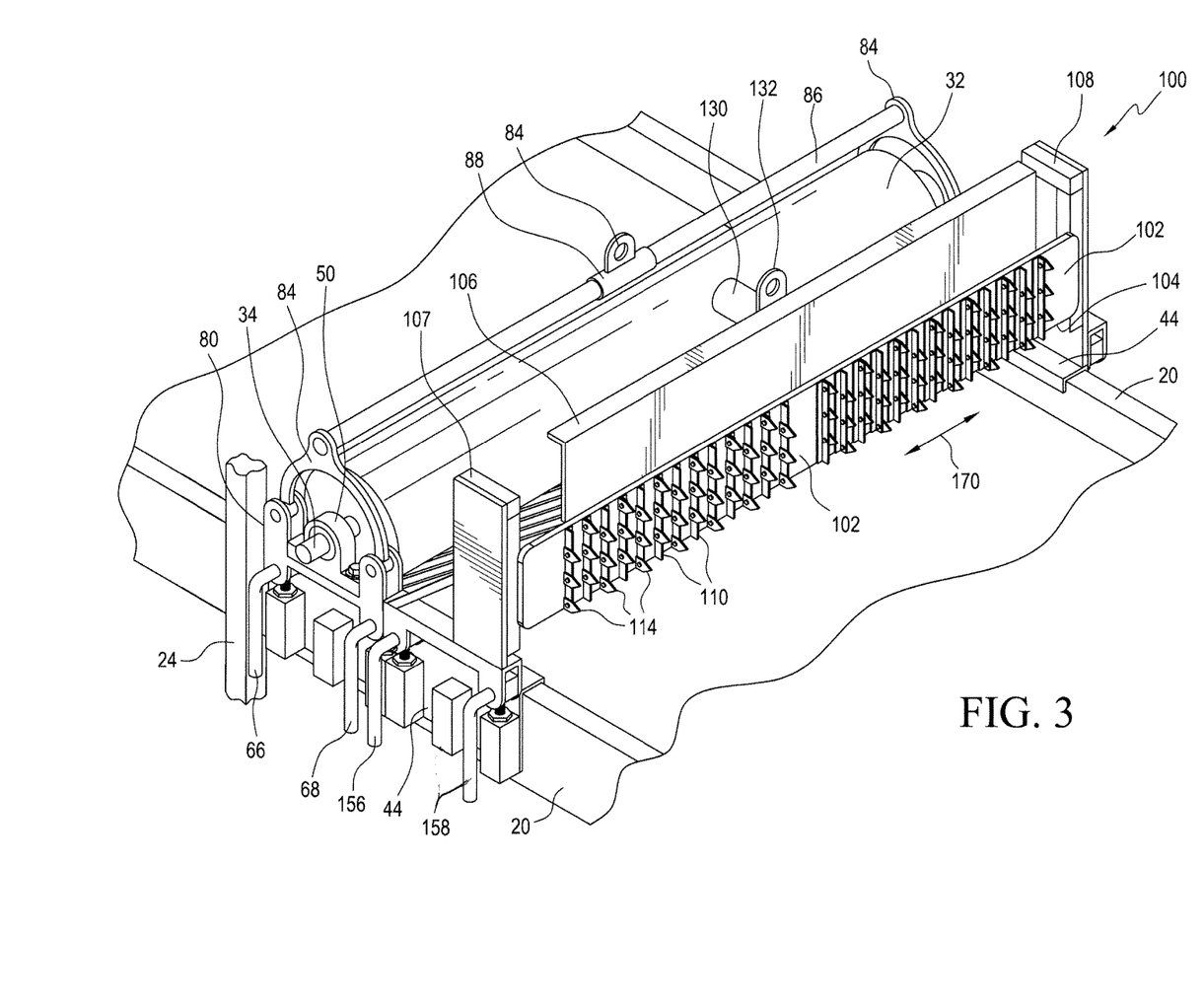
FIG. 3 is a partial top left front perspective view of the mushroom compost compacting system and the first embodiment of the mushroom compost leveling apparatus of FIG. 1.
Figure 4:
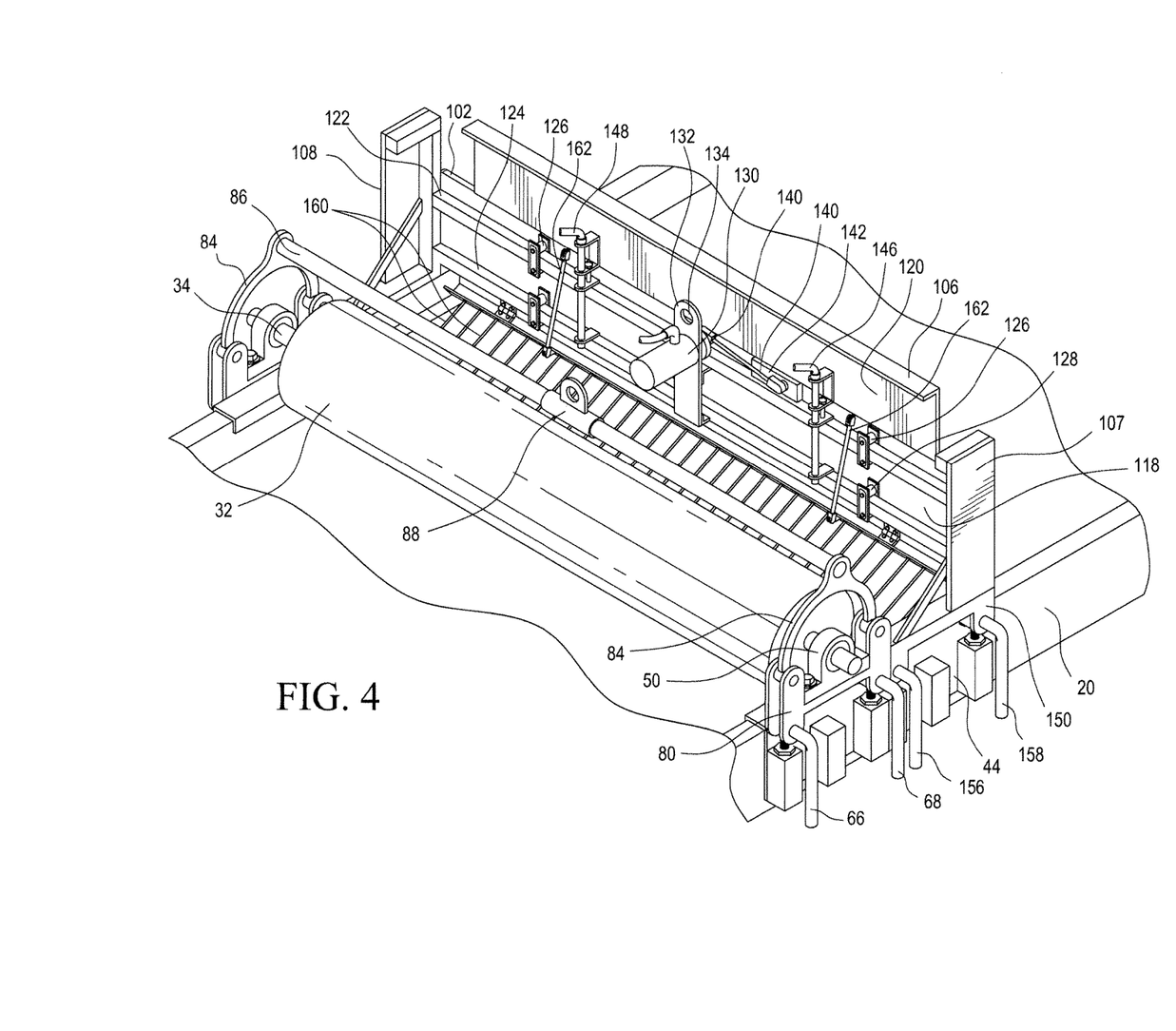
FIG. 4 is a partial top left rear perspective view of the mushroom compost compacting system and the first embodiment of the mushroom compost leveling apparatus of FIG. 1.

Referring to FIGS. 2 and 4, a channel member 58 extends beneath the bottom 22 of the compost receptacle 12 and is indirectly joined at each end to each end of the roller assembly 14. The channel member 58 supports the bottom 22 of the compost receptacle 12 at the nip of the roller 32.

On one end of the roller assembly 14, a first pillow block bearing 50 is joined to a bracket 80 using bolts or other suitable fasteners. The bracket 80 defines holes 82 to receive joining pins 66, 68 to join the bracket 80 to fixtures 54 associated with the first sleeve 44. One of the fixtures 54 joined to the first sleeve 44 that is over the first sidewall 20 of the compost receptacle 12 is in turn joined to the channel member 58. A second pillow block bearing 50 is joined to a second bracket 80 and in turn to a second sleeve 44 that is over the second sidewall 20 of the compost receptacle 12. Another fixture associated with the second sleeve 44 in turn joined to the opposite end of the channel member 58. A handle 60 is associated with the fixture 54 joined to the first sleeve 44 to permit height adjustment of the roller 32 and shaft 34 in respect of the bottom 22 of the compost receptacle and the conveyor 28. As an example, the nip height between the outer circumferential surface of the roller and the floor of the compost receptacle may be from about 2 to about 8 inches. The nip height is set at a distance that is less than the desired compacted height of the mushroom compost.

Fixtures 54 are joined to or integral with sleeves 44, wherein one sleeve fits over one of the sidewalls 20 and another sleeve fits over the opposite sidewall 20. The fixtures 54 define holes 56 to receive pins 66, 68 to secure the roller assembly 14 to the fixtures 54 and sleeve 44 at each end of the roller 32.

A bracket 80 defines holes 82 to match with holes 56 in fixtures 54 that are joined to the sleeves 44. A fork bracket 84 joins to the bracket 80 by connection via upper holes 83 in bracket 80 at each end of the roller 32. A lift post 86 extends along the length of the roller 32 and is spaced apart from the outer wall of the roller 32. The lift post 86 is held by fork brackets 84 and is seated within holes in the fork brackets 84. A sleeve 88 surrounds a portion of the lift post 86. A tongue 89 with a hole extends from the sleeve 88. The hole in such tongue 89 enables the roller assembly to be gripped by a hook 94 from the hoist 90.

Preferably, at least one of the fixtures 54 at each end of the roller assembly 14 are joined or mounted to the support, such as channel member 58, that abuts joist or horizontal member 26 extending under the bottom 22 of the compost receptacle. In one embodiment, the channel member 58 is a square hollow pipe with a length sufficient to extend under the compost receptacle, and the dimensions of such square may be from 2 inches to 6 inches. In another embodiment, the support may also comprise a solid pipe of suitable cross-sectional shape as desired.

The roller shaft 34 may be turned by hand. Preferably, the first end of the shaft 34 is coupled to a motor (not shown) for rotation of the roller 32. Suitable motors include electric and hydraulic motors rated at 1 to 5 HP, or higher HP, although any motor with sufficient capacity to rotate shaft 34 may be used.

Once installed, the mushroom compacting roller assembly 14 compacts mushroom compost from a first height to a compacted height that is less than the first height as illustrated in FIG. 2. Gauge boards (not shown) can be inserted adjacent to the side walls of the compost receptacle 12 to help workers place a quantity of mushroom compost onto the conveyor, web or liner 28 at a desired height at one end of the compost receptacle. The roller 32 is rotated and the conveyor, web or liner 28 conveys mushroom compost laid thereon to the nip between the roller 32 and the floor portion of the compost receptacle 12. The mushroom compost compacting assembly 14 can be used with pre-spawned Phase II compost or spawn run Phase III compost without adversely impacting the mushroom crop. As one example, the initial uncompacted height may be about 15 to 16 inches and the compacted height may be about 6 to 9 inches. A successful degree of compaction is determined at the mushroom grower's discretion. The mushroom compacting roller assembly 14 provides means to obtain a more uniform compaction of the mushroom compost at the top, middle and bottom portions of the compacted compost bed.

The quality of compaction of compost may be improved if a compost leveling apparatus 100, 180 is used in combination with the mushroom compacting roller assembly 14. A compost leveling apparatus 100, 180 distributes compost 16 more evenly across the width of the compost receptacle 12 before the compost 16 enters the nip between the roller 32 and the floor of the bottom 22 of the compost receptacle 12.

Referring to FIGS. 1-5, a first embodiment of a compost leveling apparatus 100 has a reciprocating panel 102 mounted for movement with respect to a supporting frame with vertical sidewalls 107, 108 and a back wall 106. The panel 102 has a bottom edge 104, a top edge, a left edge, a right edge, a front face and a rear face 118. The panel 102 preferably is formed of sheet metal, such as aluminum (0.125" 6061-T6 Aluminum). The bottom edge 104 is held at a height above the floor portion of the bottom 22 of the compost receptacle 12. In the embodiment shown, the space between the bottom edge 104 and the conveyor 28 at the bottom 22 of the compost receptacle 12 is wider than the nip between the outer surface of the roller 32 and the conveyor 28 at the bottom 22 of the compost receptacle 12. See FIG. 2. The panel 102 comprises a bottom portion of the mushroom compost leveling apparatus 100.

Preferably, a plurality or series of vertically directed vanes 110 extends outwardly and away from the front face of the panel 102. In the embodiment shown in FIGS. 1-5, a plurality of pointed teeth 114 extend outwardly from each of the vanes 110. Preferably the vanes 110 are spaced apart from one another, and may be disposed at angles from about 20 to about 90 degrees from the front face, preferably about 40 to 90 degrees, more preferably about 45 degrees. As illustrated, the vanes 110 are disposed at 90 degrees from the front face of the panel 102 and extend without angling. The vanes may be formed of 2.5×2.5" aluminum angles that are spaced apart along four inch center lines. Optionally, viewing from the front, the vanes extending from a left portion of the front face may be angled toward the left edge of the panel and the vanes extending from a right portion of the front face may be angled toward the right edge of the panel.

FIG. 4 shows the rear side of the mushroom compost leveling apparatus 100. A first rail 122 and a second rail 124 are mounted in parallel to a rear face 120 of the back wall 106 between the vertical sidewall supports 107, 108. The rails 122, 124 are spaced apart from one another and extend along the length of the rear side 118 of the panel 102. The rails 122, 124 comprise a portion of the frame that supports the panel and the top portion. The rails 122, 124 and the frame may be formed of square metal tubing, such as 1.25×1.25 inch square tubing. In one embodiment, the rails 122, 124 are spaced apart approximately 6 inches and have a length of about 72 inches.

Rollers 126 are mounted for rolling contact and traverse along the first rail 122. Rollers 128 are mounted for rolling contact and traverse along second rail 124. The frames holding rollers 126, 128 are attached to the rear face 118 of the reciprocating panel 102.

A first motor 130 is mounted to a fixture or support 132. The motor fixture 132 has a hole 134 by which the compost leveling assembly 100 may be lifted by a hoist 90 (see FIG. 5). In one embodiment, the first motor is a hydraulic motor of about 3 hp and speeds from 20 to 120 rpms. Optionally, an electric motor could be used. Referring to FIG. 4, the output shaft of the first motor 130 is joined to a crank with a crank arm 140. The opposite end 142 of the crank arm 140 is joined to the rear surface 118 of the panel 102. Rotation of the output shaft of the first motor 130 moves the crank arm 142 to cause reciprocating or side-to-side movement of the panel 102, and the wheels 126, 128 ride back and forth along the rails 122, 124. The direction of reciprocating movement is denoted by arrow 170 in FIG. 3.

The sidewalls 107, 108 of the compost leveling apparatus 100 are joined to brackets 150 that define holes 152 to match with holes 154 on fixtures 153 joined to sleeves 44 that extend over the respective sidewalls 20 of the compost receptacle 12. Pins 156, 158 are threaded through the holes 154 of the fixtures 153 and through the holes 152 of the brackets 150 to secure the compost leveling apparatus 100 to the sleeves 44. The compost leveling apparatus 100 is supported by the sleeves 44, frame formed by sidewalls 107, 108 and rails 122, 124 in position inside the compost receptacle 12 and above the bottom 22 of the compost receptacle 12.

As shown in FIGS. 2 and 4, a rake 160 with outwardly projecting prongs or fingers extends away from the bottom edge of the panel 102. The rake 160 may be joined to the rear face 118 of the reciprocating panel 102 and move with the panel. Or, the rake 160 may be joined to the inner walls of the sleeves 44 and/or to the frame sidewalls 107, 108 to be held stationary downstream from the reciprocating panel 102. The projecting prongs or fingers of the rake 160 are disposed at an angle from about 90 degrees to about 45 degrees to the back surface of the panel 102. The angle at which the projecting prongs or fingers is directed preferably may be adjusted. In one embodiment, the rake 160 is attached to the panel at or near its bottom edge with hinges. Preferably, the projecting prongs or fingers of the rake 160 are directed downwardly to some extent, and have a length of about 5 to 6 inches and are spaced apart about 2 inches. In the embodiment shown, the projecting prongs or fingers are round rods. See FIGS. 2-4.

Linkages may be supplied to join the top portion of the mushroom compost leveling apparatus to the panel. One suitable linkage comprises quick release pins 156, 158.

Referring to FIG. 4, a crane or hoist 90 may connect to the hole 134 in the motor support frame 132 for lifting the compost leveling apparatus up from the compost receptacle 12. As shown in FIG. 4, both the roller assembly 14 and the compost leveling apparatus 100 may together be lifted by one hoist 90. The hoist 90 may have a first chain 92 from which a first hook 94 suspends. The first hook 94 may engage the hole in the tongue 89 of the sleeve 88 about the post 86 of the support for the roller 34 to lift the roller assembly 14. The second hook 98 may engage the hole 134 in the motor support frame 132 to lift the compost leveling apparatus 100. The hoist 90 is joined by connection 91 to chain 300 of the lifting equipment (not shown). Before lifting the roller assembly 14 and the compost leveling apparatus 100 away from the compost receptacle 12, pins 66, 68, 156, 158 must be withdrawn from the holes in the fixtures 54, 153 of the sleeves 44 on each side of the compost receptacle 12.

Referring to FIG. 2, the mushroom compost leveling apparatus 100 is mounted over a mushroom compost receptacle 12 in advance of the mushroom compost compacting roller 34. Mushroom compost 16 is dispensed onto a conveyor 28, which travels along the floor portion of the mushroom compost receptacle 12. As the mushroom compost 16 is conveyed toward the mushroom compost leveling apparatus 100, the panel 102 is reciprocated or moved side-to-side to distribute the mushroom compost 16 material into a layer of more consistent height before the mushroom compost 16 enters the nip between the roller 34 and the floor 22 of the compost receptacle 12. The reciprocating action of the panel 102 (see arrow 170 in FIG. 3) distributes the mushroom compost 16 from the middle of the receptacle toward the edges or sidewalls 20 of the receptacle. The mushroom compost 16 is conveyed under the bottom edge 104 of the panel 102 as the panel 102 reciprocates, which levels the height of the mushroom compost material as it passes under the bottom edge 104 of the panel 102.

In a preferred embodiment, the vanes 110 extending from the front face of the panel 102 push some of the compost material 16 toward the side walls 20 of the receptacle to distribute the compost material before it is conveyed under the bottom edge 104 of the reciprocating panel 102.

The prongs or fingers of the rake 160 separate apart some clumps of mushroom compost 16 material that may have passed the bottom edge 104 of the panel 102 before the compost material 16 enters the nip between the roller 34 and the floor 22 of the compost receptacle 12.

Figure 6:
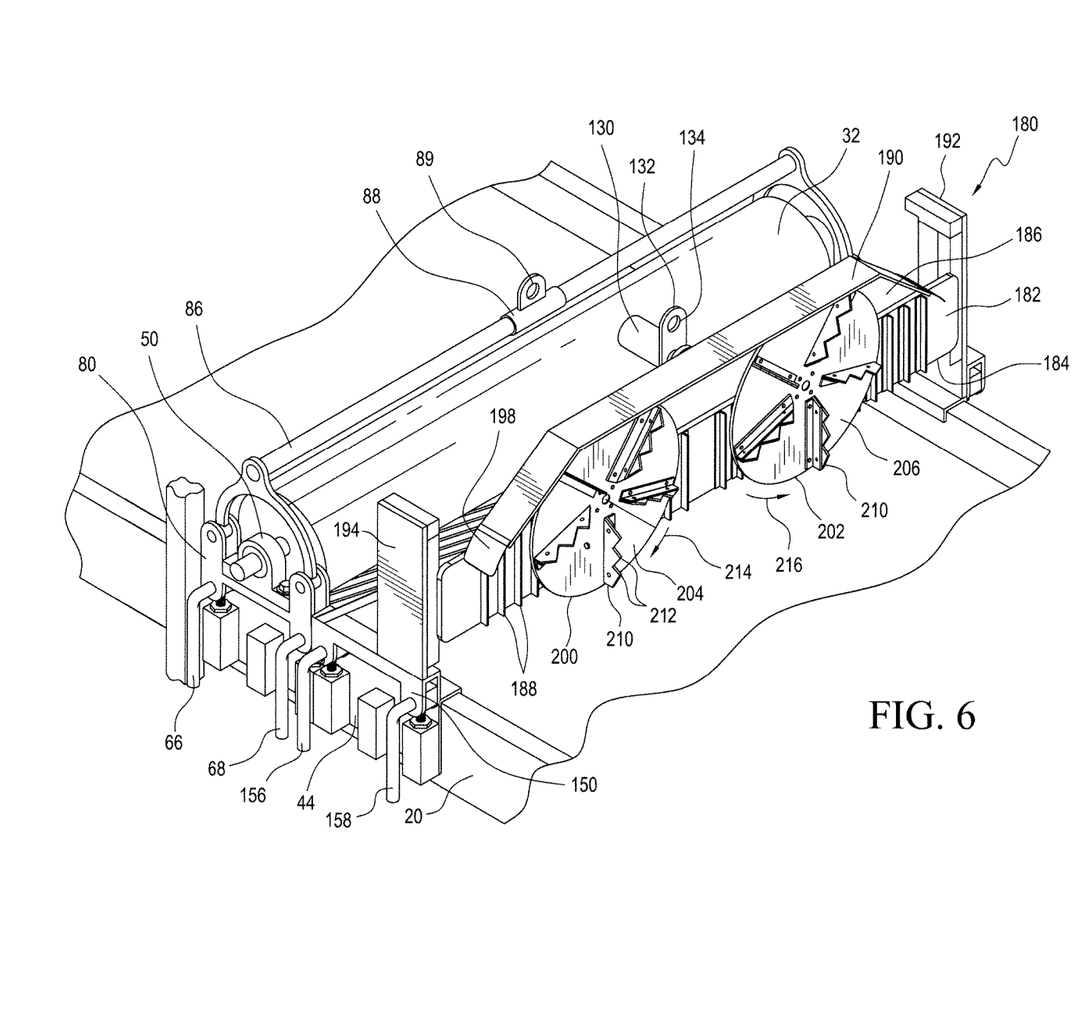
FIG. 6 is a partial top left front perspective view of the mushroom compost compacting system and a second embodiment of a mushroom compost leveling apparatus according to the invention.
Figure 7:
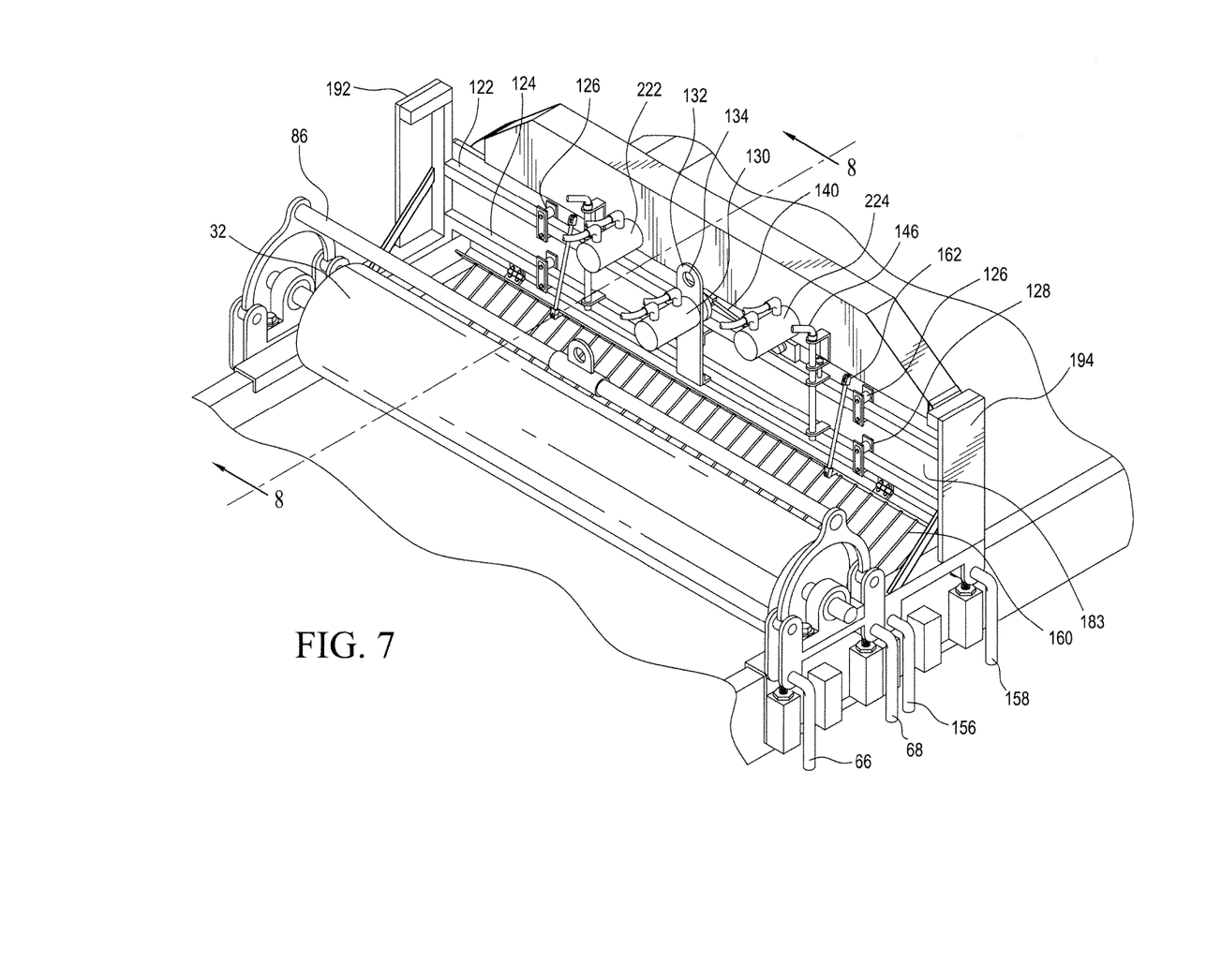
FIG. 7 is a partial top left rear perspective view of the mushroom compost compacting system and the second embodiment of the mushroom compost leveling apparatus of FIG. 6.
Figure 8:
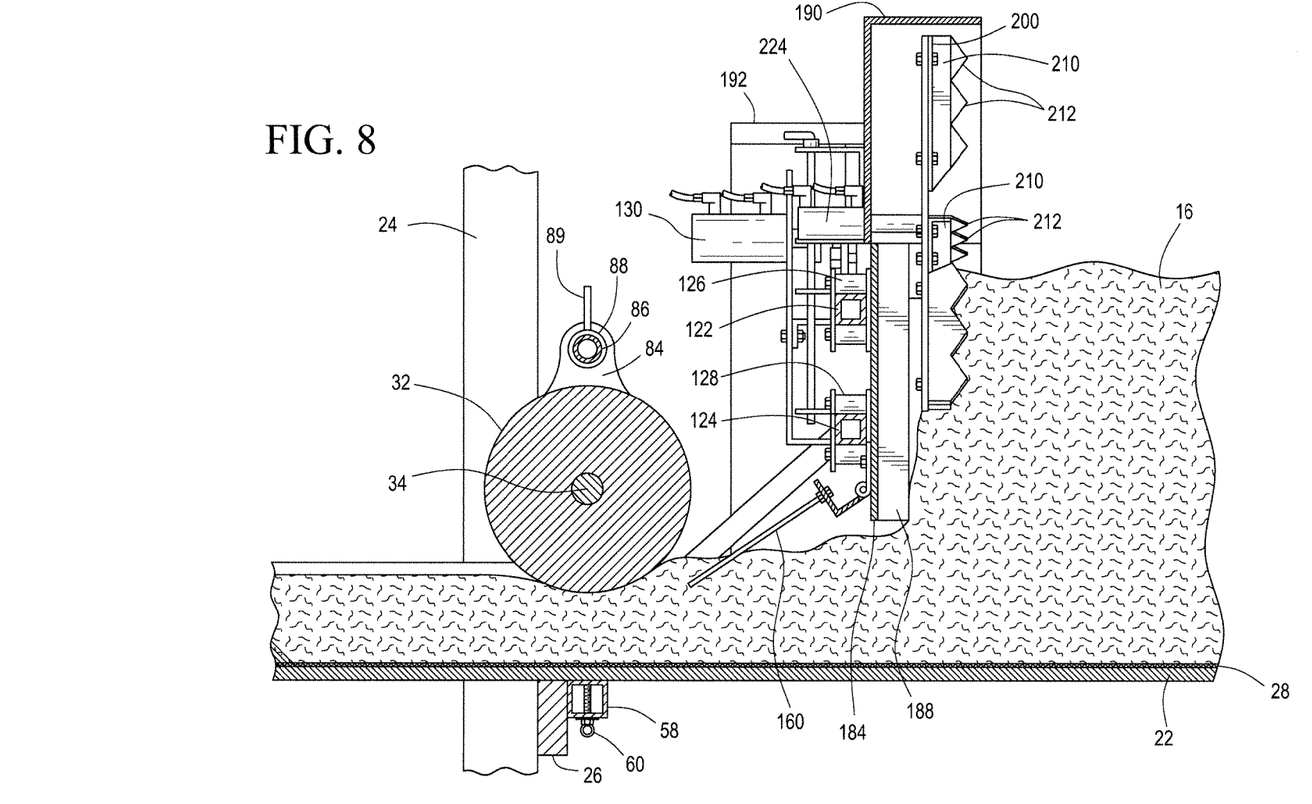
FIG. 8 is a cross-sectional view taken along line 8-8 in FIG. 7.

Referring next to FIGS. 6-8, an alternative embodiment of a compost leveling apparatus 180 is shown in advance of a roller assembly 14. The compost leveling apparatus 180 of this alternative embodiment has a reciprocating panel 182 mounted for movement with respect to a supporting frame with vertical sidewalls 192, 194, and a top shield 190. The panel 182 has a front face and a rear face 183 opposite from the front face and a bottom edge 184. The panel 182 preferably is formed of sheet metal, such as aluminum (0.125" 6061-T6 Aluminum). The bottom edge 184 is held at a height above the floor portion of the bottom 22 of the compost receptacle 12. In the embodiment shown, the space between the bottom edge 184 and the conveyor 28 at the bottom 22 of the compost receptacle 12 is wider than the nip between the outer surface of the roller 32 and the conveyor 28 at the bottom 22 of the compost receptacle 12. See FIG. 8.

A plurality or series of vertically directed vanes 188 extends outwardly and away from the front face of the panel 182. Preferably the vanes 188 are spaced apart from one another in parallel, and may be disposed at angles from about 20 to about 90 degrees from the front face, preferably about 40 to 90 degrees, more preferably about 45 degrees. Viewing from the front, the vanes extending from a left portion of the front face may be angled toward the left edge and the vanes extending from a right portion of the front face may be angled toward the right edge. Optionally, the teeth may be bent at angles to the vanes, such as angles of from 5 degrees to 40 degrees from the plane of the vanes. The vanes may be formed of 2.5×2.5" aluminum angles that are spaced apart along four inch center lines. The panel 182 comprises a bottom portion of the mushroom compost leveling apparatus 180.

FIG. 7 shows the rear side of the mushroom compost leveling apparatus 180. A first rail 122 and a second rail 124 are mounted in parallel to frames associated with the sidewall supports 192, 194. The rails 122, 124 are spaced apart from one another and extend along the length of the rear side 183 of the panel 182. The rails 122, 124 comprise a portion of the frame that supports the panel and the top portion. The rails 122, 124 and the frame may be formed of square metal tubing, such as 1.25×1.25 inch square tubing. In one embodiment, the rails 122, 124 are spaced apart approximately 6 inches and have a length of about 72 inches.

Rollers 126 are mounted for traverse along the first rail 122. Rollers 128 are mounted for traverse along second rail 124. The frames holding rollers 126, 128 are attached to the rear face 183 of the reciprocating panel 182.

Referring to FIG. 7, a first motor 130 is mounted to a fixture or support 132. The motor fixture 132 has a hole 134 by which the compost leveling assembly 180 may be lifted. In one embodiment, the first motor is a hydraulic motor of about 3 hp and speeds from 20 to 120 rpms. Optionally, an electric motor could be used. The output shaft of the first motor 130 is joined to a crank with a crank arm 140. The opposite end 142 of the crank arm 140 is joined to the rear surface 183 of the panel 182. Rotation of the output shaft of the first motor 130 moves the crank arm 142 to cause reciprocating or side-to-side movement of the panel 182, and the wheels 126, 128 ride back and forth along the rails 122, 124.

The sidewalls 192, 194 of the compost leveling apparatus 180 are joined to brackets 150 that define holes 152 to match with holes 154 on fixtures 153 joined to sleeves 44 that extend over the respective sidewalls 20 of the compost receptacle 12. Pins 156, 158 are threaded through the holes 154 of the fixtures 153 and through the holes 152 of the brackets 150 to secure the compost leveling apparatus 180 to the sleeves 44.

A rake 160 with outwardly projecting prongs or fingers extends away from the bottom edge of the panel 182. The rake 160 may be joined to the rear face 183 of the reciprocating panel 182 and move with the panel. Or, the rake 160 may be joined to the inner walls of the frame sidewalls 192, 194 to be held stationary downstream from the reciprocating panel 182. The projecting prongs or fingers of the rake 160 are disposed at an angle from about 90 degrees to about 45 degrees to the back surface of the panel 182. The angle at which the projecting prongs or fingers is directed preferably may be adjusted. In one embodiment, the rake 160 is attached to the panel at or near its bottom edge with hinges. Preferably, the projecting prongs or fingers of the rake 160 are directed downwardly to some extent, and have a length of about 5 to 6 inches and are spaced apart about 2 inches. In the embodiment shown, the projecting prongs or fingers are round rods. See FIG. 8.

Referring to FIGS. 6 and 8, a pair of wheels 200, 202 is attached for rotation to a top portion of the mushroom compost leveling apparatus 180. The top portion 190 of the apparatus has a generally pentagonal shape and is removably joined to the frame with sidewalls 192, 194 supporting the reciprocating panel 182. The wheels 200, 202 have hubs that are linked to respective second and third motors 222, 224 for rotation. The first wheel (on the left in FIG. 6) may be rotated in a clockwise direction as denoted by arrow 214. The second wheel (on the right in FIG. 6) may be rotated in a counter-clockwise direction as denoted by arrow 216. The second and third motors 222, 224 may be hydraulic motors of about of about 1 hp with speeds of about 20 to 120 rpms. Optionally, electric motors could be used. As another alternative (not shown), a mechanical drive or drives from the motor for oscillating the panel could rotate the pair of wheels.

A series of paddles or blades 210 extend outwardly from the front face of the each wheel 200, 202. As shown in FIG. 6, the paddles 210 extend radially in an array about a center of rotation of each wheel 200, 202. The paddles 210 projecting from the front faces of the wheels 200, 202 each have a series of pointed teeth 212 extending outwardly therefrom. In the embodiment illustrated, the points of the teeth project outwardly from the front faces of the wheels 200, 202 in the same direction as the paddles. Alternatively the teeth could be bent in relation to the paddles 210.

As the wheels 200, 202 are rotated, the paddles 210 push mushroom compost 16 toward the left and right edges of the panel 182 and toward the sidewalls 20 of the compost receptacle 12. In the embodiment shown, the wheels 200, 202 are disks of aluminum that have approximately 20 inch diameters. The centers of the wheels 200, 202 are spaced apart about 24 inches. Each wheel has five (5) evenly spaced apart and radially directed paddles 210.

A cover or hood 190 extends over the top portion and the pair of wheels 200, 202. Referring to FIG. 6, the cover is shown with a generally flat top, and bent side walls. Flexible curtain material 198 is draped from the bottom edges at each side of the cover 190. The cover 190 is formed of sheet metal, such as aluminum (0.125" 6061-T6 Aluminum), bent to the desired shape. The flexible curtain 198 material is rubber sheet.

Preferably, the wheels 200, 202 are not mounted directly to the panel 182. Instead, the hood 190 housing the rotatable wheels 200, 202 is mounted to the frame associated with the sidewall supports 192, 194. By separately mounting the hood 190 housing the rotatable wheels 200, 202 and the reciprocating panel 182 to the frame, the reciprocal movement of the vertically disposed panel 182 is isolated from the rotational movement of the wheels 200, 202.

In this embodiment, the paddles or blades 210 extending from the faces of the rotating wheels 200, 202 each have a series of pointed teeth 212 extending outwardly therefrom. As illustrated, the points of the teeth project in the same direction as the paddles or blades. Optionally, the teeth may be bent at angles to the paddles or blades, such as angles of from 5 degrees to 40 degrees from the plane of the respective paddle or blade.

In this embodiment, as the wheels 200, 202 are rotated in opposite directions of rotation as indicated by arrows 214, 216 in FIG. 6, the paddles 210 extending from the wheels push or throw mushroom compost 16 material toward the side walls 20 of the receptacle 12 to distribute the compost material 16 more evenly before it is conveyed under the bottom edge 184 of the reciprocating panel 182, and before it is conveyed to the nip of the roller 32 of the roller assembly 14.

While not wishing to be bound by one theory, it is believed that the teeth projecting outwardly from the vanes of the reciprocating panel and from the paddles or blades of the wheels better break apart clumps or mounds of mushroom compost material during leveling, helping to pass the material under the reciprocating panel of the mushroom compost leveling apparatus for improved leveling. The rake teeth further break apart clumps or mounds of compost material as part of the leveling in advance of the roller assembly. The roller assembly then squeezes the compost material in the roller nip to compact the mushroom compost material to a desired thickness and compaction.

Figure 5:
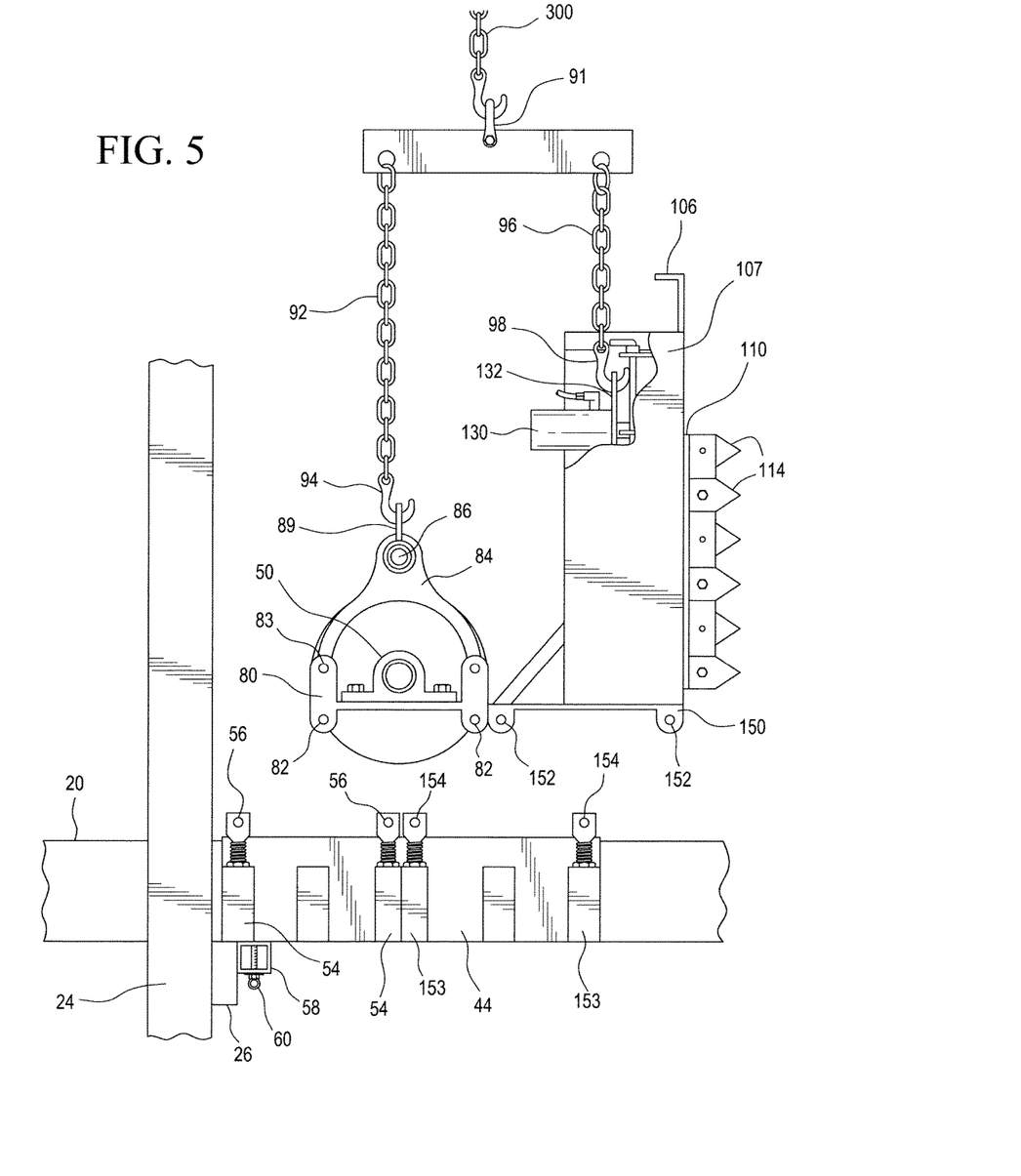
FIG. 5 a side elevational view of a hoist suspending the mushroom compost compacting system and the first embodiment of the mushroom compost leveling apparatus of FIG. 1 over a mushroom bed.

Upon completing compaction of compost to a desired thickness within a first bin or tray of a mushroom compost bed 10, the mushroom compacting roller assembly 14 and the compost leveling apparatus 100, 180 may be detached from the sidewalls 20 of the compost receptacle 12 and attached to another bin or tray. As shown in FIG. 5, the compacting roller assembly 14 and the compost leveling apparatus 100 may be hoisted together. A similar hoisting lift of the alternative embodiment of compost leveling apparatus 180 together with the compacting roller assembly 14 is also possible.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A mushroom compost leveling apparatus, comprising:
   a panel with a front face, a rear face opposite the front face and a bottom edge, said panel mounted vertically between first and second sidewalls of a mushroom compost receptacle with the front face substantially perpendicular to a floor of the mushroom compost receptacle, and leaving a gap between the bottom edge and the floor of the mushroom compost receptacle, wherein the front face of the panel defines a front face surface, and further comprising a plurality of vertically directed vanes extending outwardly from the front face surface of the panel, wherein the mushroom compost receptacle is adapted to receive mushroom compost within a receptacle volume established by the floor and between the first and second sidewalls;
   a motor with a rotating output shaft; and
   a crank arm with a first end and a second end, wherein the first end of the crank arm is joined to the panel and the second end of the crank arm is joined to the rotating output shaft of the motor so that motor output shaft rotation is convertible to reciprocal motion to reciprocate the panel to cause side to side movement of the panel toward and away from the first sidewall within the receptacle volume of the mushroom compost receptacle.

2. The mushroom compost leveling apparatus of claim 1, wherein the vertically directed vanes are disposed at an angle from 20 degrees to 90 degrees from the front face surface of the panel.

3. The mushroom compost leveling apparatus of claim 1, further comprising one or more teeth projecting outwardly from each of the vanes of the plurality of vanes.

4. The mushroom compost leveling apparatus of claim 1, further comprising a rake extending from the panel.

5. The mushroom compost leveling apparatus of claim 4, wherein the rake defines a plurality of fingers that extend away from the rear face of the panel at an angle thereto.

6. The mushroom compost leveling apparatus of claim 1, wherein a rake extends downwardly from a rear surface of a frame to which the panel is joined.

7. The mushroom compost leveling apparatus of claim 1, further comprising at least one roller assembly spaced apart from the panel, said roller assembly having a roller adapted for rotation on a shaft, a first fixture coupled to a first end of the shaft, a second fixture coupled to a second end of the shaft, a first sleeve mounted onto a first sidewall of the mushroom compost receptacle and coupled to the first fixture, and a second sleeve mounted onto a second sidewall of the mushroom compost receptacle and coupled to the second fixture, and a support channel positioned under the floor of the mushroom compost receptacle that is coupled to the first fixture and the second fixture.

8. The mushroom compost leveling apparatus of claim 7, wherein the panel is mounted to a frame, and said frame is coupled to the first sleeve and to the second sleeve.

9. A method for leveling mushroom compost, comprising:
   installing the mushroom compost leveling apparatus according to claim 1 into the receptacle volume of the mushroom compost receptacle, and establishing the gap between the floor of the mushroom compost receptacle and the bottom edge of the panel of the mushroom compost leveling apparatus;
   moving a conveyor along the floor of the mushroom compost receptacle and through the gap;
   introducing mushroom compost onto the conveyor;
   reciprocating the panel of the mushroom compost leveling apparatus toward and away from the first sidewall within the receptacle volume of the mushroom compost receptacle; and
   pushing the mushroom compost toward the sidewalls of the mushroom compost receptacle with the vanes vertically disposed and outwardly directed from the front face surface of the panel.

10. The method for leveling mushroom compost of claim 9, further comprising:

raking the mushroom compost with fingers of a rake joined to the panel.

11. The method for leveling mushroom compost of claim 9, further comprising:

compacting the mushroom compost after it has been conveyed by the conveyor through the gap between the bottom edge of the panel of the mushroom compost leveling apparatus and the floor of the mushroom compost receptacle.

12. The method for leveling mushroom compost of claim 11, wherein the compacting is performed with a roller.

13. A method for leveling mushroom compost, comprising:

providing a mushroom compost receptacle having opposite sidewalls and a floor defining a receptacle volume space adapted to receive mushroom compost;

reciprocating a panel with a bottom edge and a face perpendicular to the bottom edge that is held in vertical or substantially vertical orientation within the mushroom compost receptacle between the opposite sidewalls of the mushroom compost receptacle, wherein a gap is established between the bottom edge of the panel and the floor of the mushroom compost receptacle, and wherein said reciprocating is side-to-side movement of the panel toward and away from one of the sidewalls of the mushroom compost receptacle;

pushing the mushroom compost toward the opposite sidewalls of the mushroom compost receptacle, wherein the pushing is performed with vanes extending outwardly from the face of the panel; and conveying mushroom compost through the gap.

14. The method for leveling mushroom compost of claim 13, further comprising:

raking the mushroom compost emerging from the gap.

15. The method for leveling mushroom compost of claim 14, wherein the raking is performed with fingers extending from the panel.

* * * * *